United States Patent [19]

Thayer et al.

[11] Patent Number: 4,714,197

[45] Date of Patent: Dec. 22, 1987

[54] 2-D PROPULSIVE LIFT NOZZLE

[75] Inventors: Edward B. Thayer, Jupiter; Eric J. Ward, West Palm Beach, both of Fla.

[73] Assignee: United Technologies Corporation, Hartford, Conn.

[21] Appl. No.: 881,375

[22] Filed: Jul. 2, 1986

[51] Int. Cl.⁴ .............................................. B64C 15/00
[52] U.S. Cl. ................................. 239/265.29; 244/12.5; 244/23 D; 239/265.19
[58] Field of Search ................... 239/265.19, 265.27, 239/265.29; 244/12.5, 23 D, 110 B

[56] References Cited

U.S. PATENT DOCUMENTS

| | | | |
|---|---|---|---|
| 2,951,660 | 9/1960 | Gilihenty | 244/110 B |
| 4,000,854 | 1/1977 | Konarski | 244/23 D |
| 4,052,007 | 10/1977 | Willard | 239/265.29 |
| 4,175,385 | 11/1979 | Nash | 239/265.27 |
| 4,375,276 | 3/1983 | Konarski | 239/265.29 |
| 4,392,615 | 7/1983 | Madden | 239/265.37 |
| 4,505,443 | 3/1985 | Bradfield | 239/265.27 |
| 4,641,782 | 2/1987 | Woodward | 239/265.29 |

*Primary Examiner*—Kenneth J. Dorner
*Assistant Examiner*—Gerald A. Anderson
*Attorney, Agent, or Firm*—Troxell K. Snyder

[57] ABSTRACT

A two-dimensional nozzle for directing the exhaust of a gas turbine engine includes two spaced apart vertical sidewalls (16), an upper flap assembly (18) and a lower flap assembly (20). The upper flap assembly (20) includes at least a dorsal flap (22) pivotable about a first fixed axis (24). The lower flap assembly (20) includes a ventral flap (28) centrally pivotable about a second fixed axis (30) for creating a dual throat exhaust flow path.

7 Claims, 12 Drawing Figures

2-D PROPULSIVE LIFT NOZZLE

FIELD OF THE INVENTION

The present invention relates to an exhaust nozzle for selectably directing the exhaust of a gas turbine engine.

BACKGROUND

Two-dimensional variable area nozzles for vectoring the exhaust gases of a gas turbine engine are known in the art. Such nozzles are typically used in aircraft applications in which it is desired to achieve vertical or short takeoff and landing (V/STOL) operation. One such nozzle is shown in U.S. Pat. No. 4,392,615, "Viol (sic) Exhaust Nozzle with Veer Flap Extension" issued July 12, 1983 to Madden. Madden shows an exhaust nozzle having a rotatable hood type deflector for redirecting the engine exhaust gases downward. A movable ventral flap defines the variable nozzle throat between itself and the deflector hood during vectored thrust operation.

U.S. Pat. No. 4,375,276, "Variable Geometry Exhaust Nozzle" issued Mar. 1, 1983 to Konarski shows a vectorable nozzle having a pair of vertically opposed, articulated flap assemblies which are manipulated to vary both nozzle throat area and exhaust thrust direction. U.S. Pat. No. 4,052,007, "Flap-Type Two-Dimensional Nozzle" issued Oct. 4, 1977 to Willard shows a two-dimensional nozzle having a pair of vertically opposed flaps movable collectively between a position of maximum throat area and minimum throat area and a vertically opposed, centrally pivotable pair of downstream flaps movable both collectively and individually for directing the exhaust gases to achieve forward, reverse, modulated, or vectored thrust as desired.

The complexity of these prior art systems is immediately apparent, resulting from the large number of functional demands placed upon such nozzle arrangements. The vectoring of the thrust of a typically horizontally disposed gas turbine engine requires a duct or other structure which is physically strong in order to withstand the high gas pressures, thermally protected to withstand the high exhaust gas temperatures, and aerodynamically configured to provide the appropriate flow area and direction upon demand. Vectoring nozzles used in combination with augmented or other gas turbine engine arrangements requiring a variable nozzle throat area add an additional level of mechanical complexity by requiring the vectoring nozzle to also contract or enlarge the nozzle throat area at any thrust vector angle.

Thrust vectoring may be achieved either partially (up to 60° from the horizontal) or fully (at least 90° from the horizontal), depending upon the particular aircraft and desired operational characteristics. In either case, the vectoring of the exhaust gases downward is intended to support at least a portion of the aircraft mass by means of the vertical exhaust gas thrust component rather than through the use of the aircraft wing surfaces.

Typical engine arrangements place the engine exhaust nozzles aft of the aircraft center of gravity, resulting in a downward pitching moment during vectored thrust operation. One prior art design, shown in the Madden reference, actually moves the thrust vector aft during vectored thrust operation, exacerbating the downward pitching moment which must be counterbalanced to achieve stable aircraft operation.

An exhaust nozzle configuration which reduces this undesirable downward pitching moment during vectored thrust operation, which has a minimum number of moving flap surfaces in contact with the hot exhaust gas stream, and which, for augmented engine applications, is able to provide a selectable variable nozzle throat area throughout the entire range of vectored thrust operation is clearly a significant improvement over those nozzles defined in the prior art.

SUMMARY OF THE INVENTION

It is therefore an object of the present invention to provide a two-dimensional exhaust nozzle for selectably vectoring the flow of exhaust gas from a gas turbine engine or the like.

It is further an object of the present invention to provide a vectoring exhaust nozzle having a minimum number of moving parts in contact with the engine exhaust gas.

It is still further an object of the present invention to provide a vectoring exhaust nozzle wherein the nozzle thrust vector moves forward as the exhaust gas vector angle increases.

Accordingly, an exhaust nozzle for a gas turbine engine is provided for receiving a high velocity exhaust gas stream discharged from a gas turbine engine. The nozzle includes a duct defined by two stationary, spaced apart sidewalls and an upper flap assembly and a lower flap assembly. The upper flap assembly includes a dorsal flap pivotable about a fixed axis extending between the sidewalls. The lower flap assembly includes a ventral flap pivotable about a second fixed axis disposed intermediate the fore and aft edges thereof and also extending between the sidewalls.

The nozzle according to the present invention is configurable to provide partial (up to 60° from the horizontal) vectoring for an unaugmented gas turbine engine; partial vectoring and variable nozzle throat area for an augmented gas turbine engine, or the like; or full (at least 90° from the horizontal) vectoring and variable nozzle throat area also for an augmented gas turbine engine. In each configuration, the upper and lower flap assemblies cooperatively define the outlet flow direction from the duct and thus the desired thrust vector. Further, the lower flap assembly defines a dual throat discharge nozzle when vectoring the exhaust gas flow from the horizontal, thereby both more effectively redirecting the engine exhaust gas stream as well as moving the nozzle thrust vector forward with increasing vector angle.

In the non-augmented, partial vectoring first embodiment, the nozzle according to the present invention includes a dorsal flap pivotable adjacent the fore edge thereof about a fixed first axis. The exhaust gases are vectored by simultaneously pivoting the dorsal flap and the centrally pivoted ventral flap to achieve the desired vector angle.

In the augmented, partial vectoring, second embodiment, the dorsal flap of the upper flap assembly is also pivotable about a fixed first axis at the fore edge thereof, and is further pivotally joined at its aft edge to the fore edge of a downstream flap which moves responsive to the pivoting of the dorsal flap. The lower flap assembly is substantially identical to that of the first embodiment.

The dorsal flap rotates independently of the ventral flap, selectably varying the nozzle throat area in response to engine-augmentor operation as well as vectoring the exhaust gas flow in cooperation with the centrally pivoted dorsal flap. A fairing link, extending between the aft edge of the downstream flap and a fixed dorsal wall defines the orientation of the downstream flap to achieve the convergent-divergent exhaust gas flow path required by the augmented engine combination.

In the augmented, fully vectoring, third embodiment, the dorsal flap is rotatable about a fixed axis disposed within the exhaust gas stream while the downstream flap is additionally selectably pivotable relative to the dorsal flap. The upper flap assembly, in cooperation with the centrally pivoted ventral flap, provides a convergent-divergent variable throat area exhaust duct which is vectorable at least 90° from the horizontal thrust direction.

By requiring only three or fewer moving flaps to contact the hot engine exhaust, the nozzle according to the present invention decreases the complexity and coolant demand of the hot gas contacting surfaces, reducing manufacturing, operation, and maintenance costs. The movement of the vertical thrust vector component forward with increasing gas vectoring is particularly well suited for aircraft having a center of gravity located forward of the nozzle by providing a reduction in pitching moment over prior art arrangements. Both these and other advantages and features of the nozzle according to the present invention will become apparent following a careful review of the following description and the appended claims and drawing figures.

BEST MODE FOR CARRYING OUT THE INVENTION

1. First Embodiment

Figure 1:
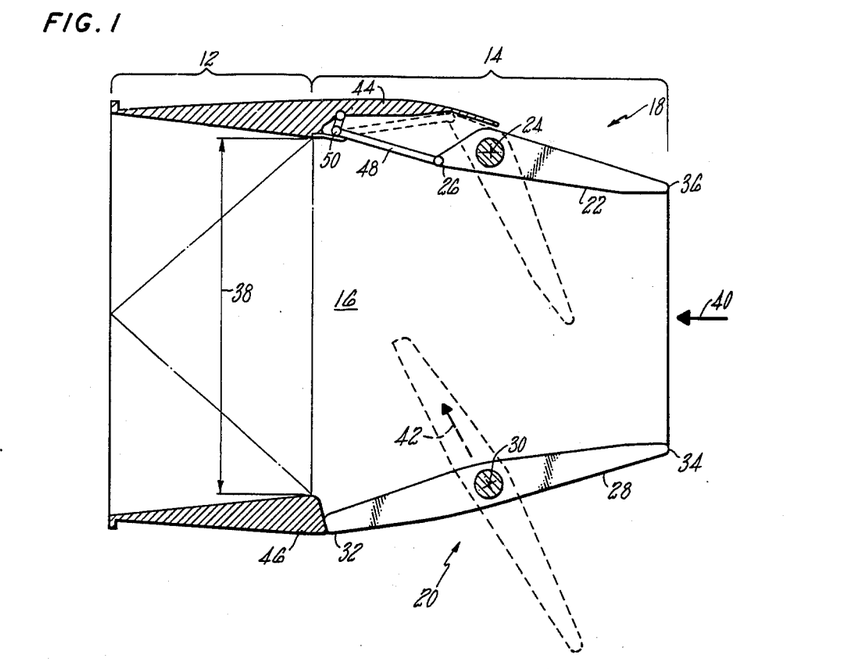
FIG. 1 shows a cross sectional side view of the first embodiment of the exhaust nozzle according to the present invention.

FIG. 1 shows a cross section of a first embodiment of the nozzle according to the present invention. The nozzle includes a transition section 12 for receiving a high speed stream of hot exhaust gases from a gas turbine engine or the like. The transition section reshapes the typically circular flow area of the engine exhaust into a rectangular flow area and introduces the exhaust gas stream into the duct portion 14 of the nozzle formed by a pair of vertical, spaced apart sidewalls, only one 16 of which is shown in FIG. 1, and an upper flap assembly 18 and a lower flap assembly 20. The upper flap assembly 18 includes a dorsal flap 22 pivotable about a first fixed axis 24 extending between the sidewalls and located proximate the fore edge 26 of the flap 22.

The lower flap assembly 20 comprises a single, ventral flap 28 supported and rotatable about a second fixed axis 30 disposed intermediate the fore 32 and aft 34 edges of the flap 28.

The nozzle embodiment of FIG. 1 provides horizontal thrust when the flap assemblies 18, 20 are positioned as shown in the solid outlines, defining a horizontal gas flow path exiting the nozzle at the outlet plane defined by the aft edges 36, 34 of the upstream and ventral flaps 22, 28. The nozzle throat height 38 occurs at the entrance to the duct 14 in the FIG. 1 embodiment and remains fixed as thrust is vectored from the horizontal direction. It should be noted that "horizontal" as used herein is meant to define the unvectored flow direction of the engine exhaust gases. Although typically being coincident with the engine center line, the "unvectored" exhaust gas flow stream may be discharged in a variety of other directions, depending upon the particular aircraft and/or application.

Vectoring of the exhaust gas stream from the horizontal for the FIG. 1 embodiment is accomplished by collectively pivoting the dorsal flap 22 and the ventral flap 28 about their respective fixed axes 24, 30. The FIG. 1 embodiment is a partial vectoring arrangement, suitable for diverting the exhaust gas stream up to approximately 60° from the horizontal when the upper and lower flap assemblies 18, 20 are positioned as shown by the broken outlines. It should also be noted that the exhaust gas thrust vector, roughly coincident with the center line of the discharged exhaust gas, moves forward as the gas is vectored from the horizontal. For example, in the horizontal, unvectored orientation of the FIG. 1 nozzle, the thrust vector is represented by the heavy arrow 40 as shown. In the vectored configuration, the center line of the discharged exhaust gases lies approximately along the rotated ventral flap 28, indicating a thrust vector represented by the broken heavy arrow 42. It is clear that the vertical component of the thrust vector 42 of the diverted exhaust gas stream occurs significantly forward of the comparable thrust vector produced by the downstream rotating hood of the prior art or similar structures.

As will be appreciated by those skilled in the art, the rotatable flaps 22, 28 must sealingly engage the respective dorsal and ventral fixed walls 44, 46 as appropriate in order to confine and direct the exhaust gas stream. The ventral flap 28 need only accomplish such sealing engagement at the fore end 32 during unvectored operation. The dorsal flap 28 of the upper flap assembly 18 must accomplish this sealing throughout the indicated range of movement. Such sealing may be accomplished in at least two ways, first by providing a rotating seal proximate the pivot axis 24 for maintaining a gas tight engagement between the dorsal wall 44 and the flap 22. The second, illustrated in FIG. 1, utilizes a seal flap 48 hinged to the fore edge thereof and cooperating with a sliding seal surface 50 as shown. Either arrangement, as well as others known in the art and equivalent in operation, provide the required gas tight connection between the upper flap assembly 18 and the dorsal wall 44 without exposing more than three movable flap surfaces 48, 22, 28 through the hot exhaust gas stream.

For those applications wherein the gas stream temperature is such as to require active cooling for other thermal protection of those surfaces exposed thereto, the small number of moving parts being protected in the nozzle according to the present invention greatly reduces the complexity and demand of the cooling system.

2. Second Embodiment

Figure 2A:
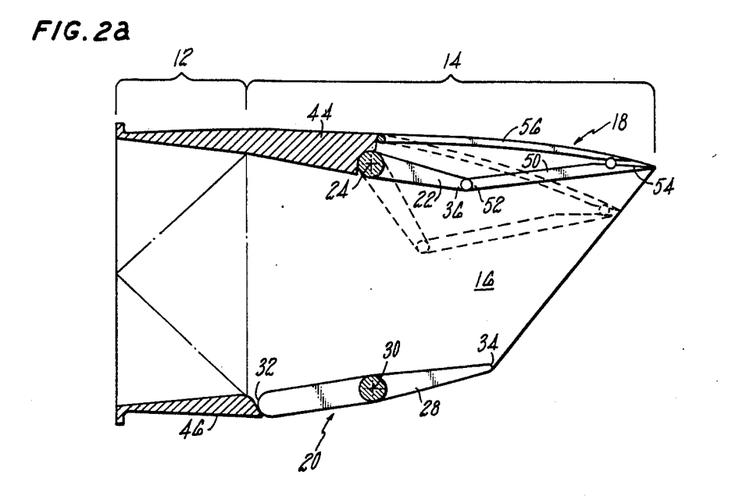
FIGS. 2a and 2b show cross sectional views of the second embodiment of the nozzle according to the present invention at various conditions of vectored and reduced nozzle throat area operation.
Figure 2B:
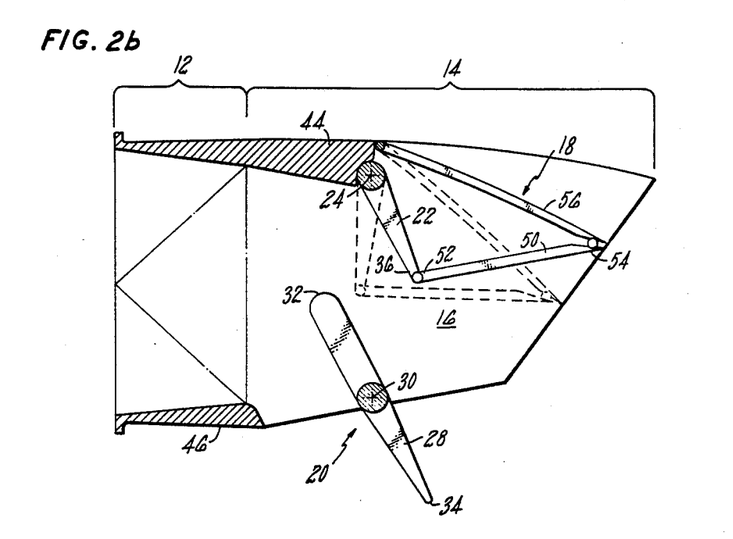

These features and advantages are also achieved in the second embodiment of the nozzle according to the present invention as shown in FIGS. 2a and 2b. As in the FIG. 1 embodiment, the second embodiment includes a transition section 12 and a duct section 14, an upper flap assembly 18, a lower flap assembly 20, and a pair of opposed sidewalls of which only one 16 is again shown. The lower flap assembly 20 is essentially identical to that of the first embodiment, including a ventral flap 28 pivotable about a second fixed axis 30 disposed intermediate the fore and aft ends 32, 34. The upper flap assembly 18 still includes the dorsal flap 22 pivotally supported about a first fixed axis 24 and sealingly engaged with the fixed dorsal wall 44.

The variable throat area embodiment of FIG. 2a and 2b additionally includes a downstream flap 50 pivotally linked at the fore edge 52 thereof to the aft edge 36 of the dorsal flap 22. The aft edge 54 of the downstream flap 50 is positioned by means of a fairing link 56 extending between the downstream flap aft edge 54 and the fixed dorsal wall 44.

Like reference numerals in FIGS. 2a and 2b denote like components, while the solid outlines of the upper and lower flap assemblies 18, 20 in each Figure show the orientation of the individual components at maximum nozzle throat area in the horizontal (FIG. 2a) and partially vectored (FIG. 2b) flow configurations. The dashed outlines represent the positions of the upper flap assembly 18 components for achieving reduced nozzle throat area in the respective exhaust gas discharge orientations.

As should be apparent from the drawings and foregoing discussion, the dorsal flap 22 and the ventral flap 28 may be pivoted collectively about their respective fixed axes 24, 30 to achieve vectored exhaust gas flow at maximum nozzle throat area. Additionally, the dorsal flap 22 may be rotated independently to diminish exhaust nozzle throat area as may be required in, for example, an augmented gas turbine engine installation. It should also be noted that the exhaust gas flow path defined by the sidewalls and upper and lower flap assemblies 18, 20 of the second embodiment nozzle according to the present invention is of the convergent-divergent type and thus suitable for expanding supersonic gas flow streams. As with the first embodiment described hereinabove, the second embodiment requires no more than three moving flap surfaces to contact the exhaust gas stream and likewise moves the thrust vector forward as the exhaust gas flow is diverted from the horizontal.

3. Third Embodiment

Figure 3:
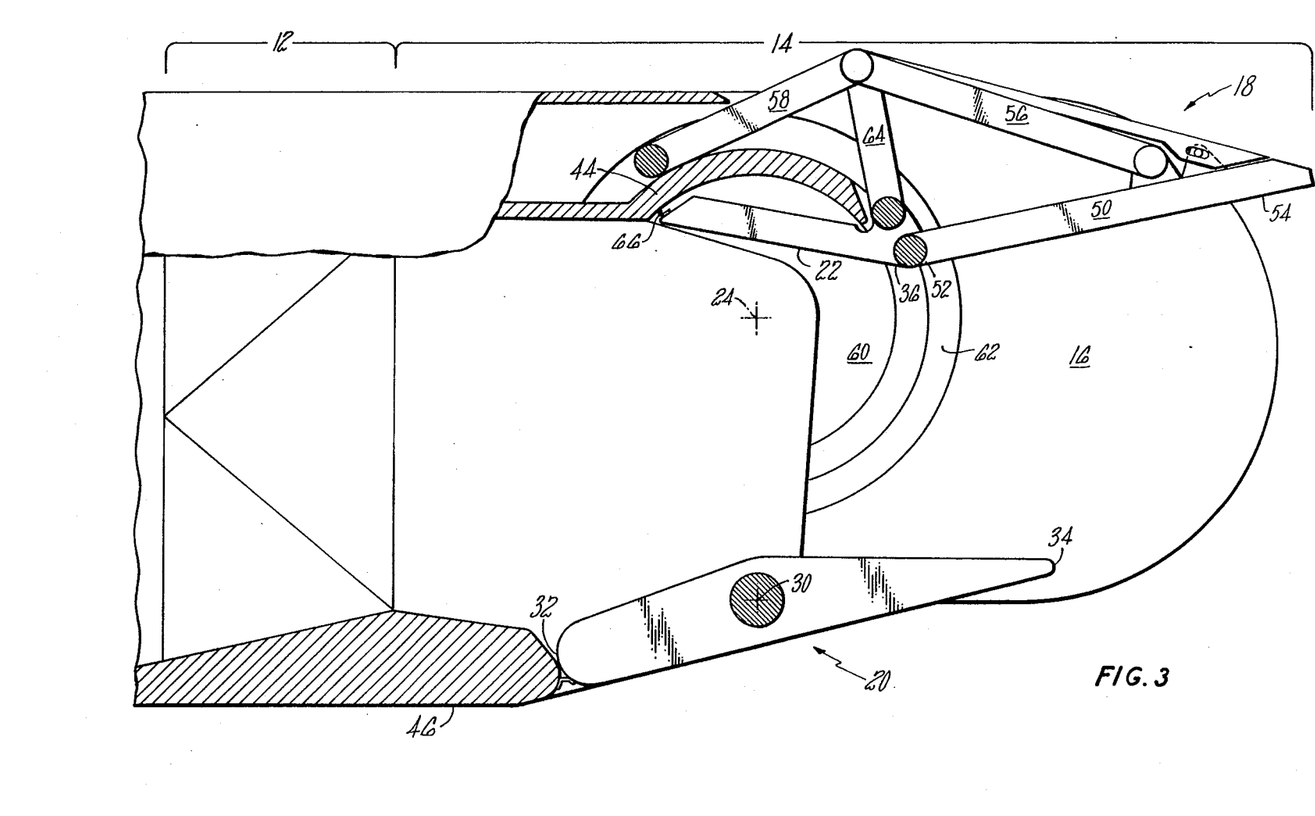
FIG. 3 shows a sectional side view of the third embodiment of the nozzle throat according to the present invention.

These advantages and features are present in the third embodiment of the nozzle according to the present invention, shown in cross section in FIG. 3 and having the additional feature of being able to fully divert the exhaust gas stream at least 90° from the horizontal.

Referring now in particular to FIG. 3, the nozzle of the third embodiment is seen as including a transition section 12 and duct section 14 as in the first and second embodiments. An upper flap assembly 18 and a lower flap assembly 20 extend between vertical, spaced apart sidewalls one of which 16 is shown in the cross section. As with the second embodiment, the upper flap assembly 18 includes a dorsal flap 22 and a downstream flap 50, pivotally connected at their respective aft edge 36 and fore edge 52 and cooperatively defining an exhaust gas directing barrier. The dorsal flap 22 is rotatable about a fixed axis 24 which, unlike the first and second embodiments described above, is not coincident with the flap 22, but rather spaced apart therefrom and disposed in the flowing exhaust gas. The dorsal flap 22 is thus both rotated and displaced as it is pivoted about the first fixed axis 24, moving both rearwardly and downwardly into the flowing gas stream as described below. The downstream flap 50 is, as in the second embodiment, positionally oriented by the action of a fairing link 56 cooperatively attached at one end proximate the trailing edge 54 of the downstream flap 50.

In the third embodiment of the nozzle according to the present invention, the fairing link 56 is connected at the other end thereof to a thrust link 58 which is in turn selectably movable to orient the downstream flap 50 relative to the dorsal flap 22. The lower flap assembly 20 is substantially identical to that of the first and second embodiments, including a ventral flap 28, having a fore edge 32, an aft edge 34, and being pivotable about a second fixed axis 30 passing therethrough.

Rotation of the dorsal flap 22 is accomplished by mounting the flap 22 between a pair of opposed disks, one of which 60 appears in FIG. 3. The center of the first pair of disks 60 is coincident with the first fixed axis 24 providing the motion described hereinabove to the dorsal flap 22. The downstream flap 50 is positioned by connecting the thrust link 58 to a second pair of disks 62 disposed concentrically about the first pair of disks 60 at the opposite sidewalls. The relative rotation of the first and second pair of disks 60, 62 results in relative rotational movement between the dorsal flap 22 and the downstream flap 50 via the connecting linkage 56, 58. In the third embodiment shown in FIG. 3, a connecting link 64 is provided between the dorsal flap 22 and the connection between the fairing link 56 and the thrust link 58 to establish a four bar linkage 64, 56, 50, 22 for transferring the motion of the thrust link 58 to the downstream flap 50.

Figure 7A:
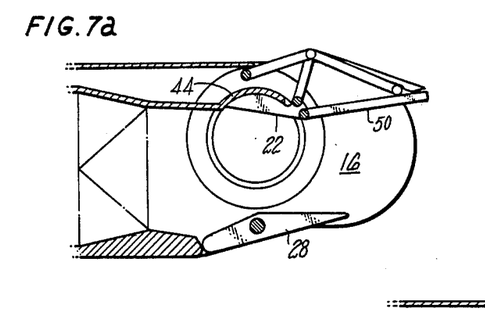
FIGS. 7a-e show a schematic side view of the third embodiment of the nozzle according to the present invention at various vectoring angles and nozzle throat areas.

FIGS. 7a through 7e show a schematic representation of the third embodiment of the nozzle according to the present invention in a variety of nozzle throat openings and vectoring configurations. FIG. 7a is essentially a duplication of FIG. 3 showing the three gas contacting, moving flaps 22, 50, 38 in an orientation for delivering horizontal thrust at a maximum nozzle throat opening.

Figure 7B:
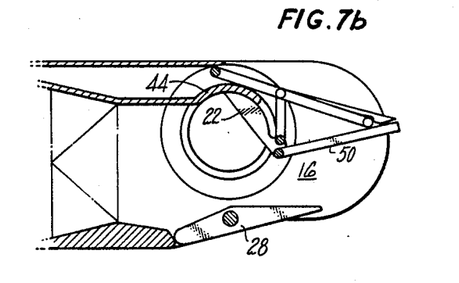

FIG. 7b shows the dorsal flap 22 rotated partially into the exhaust gas stream for constricting the nozzle throat while the downstream flap 50 and the ventral flap 28 remain oriented for exhausting the gases horizontally. FIG. 7b most clearly shows the convergent-divergent exhaust gas flow path defined by the duct, with the downstream flap being oriented responsive to aircraft speed, altitude, etc. in order to achieve the most efficient thrust level for the current nozzle configuration.

Figure 7C:
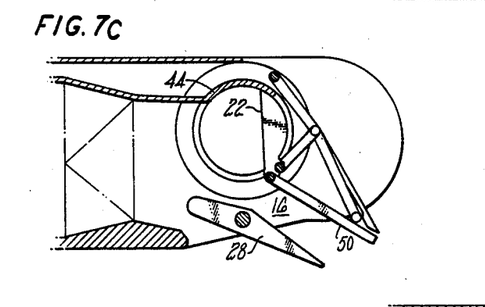

FIG. 7c shows the third embodiment nozzle in a configuration for vectoring the flow of exhaust gases at approximately 30° from the horizontal. The dorsal flap 22 has been rotated still further into the exhaust gas stream while the ventral flap 28 and the downstream flap 50 have been aligned at approximately 30° with respect to the horizontal for redirecting the exhaust gases. As will be appreciated by those skilled in the art, the nozzle throat opening in the FIG. 7c vectored configuration may be varied by repositioning the dorsal flap 22 while maintaining the downstream flap 50 substantially parallel to the partially rotated ventral flap 28.

Figure 7D:
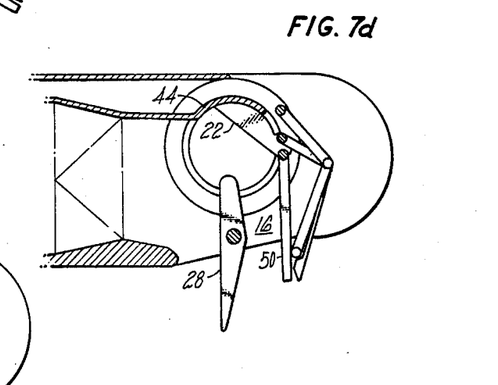
Figure 7E:
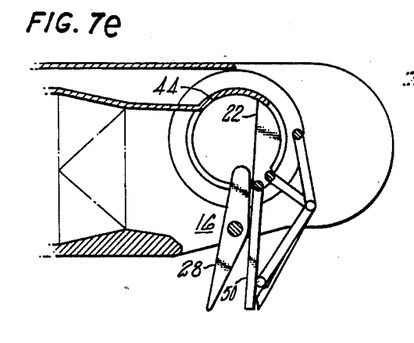

FIG. 7d shows the third embodiment nozzle with the moving flaps positioned for delivering 90° vectored thrust at the maximum nozzle throat opening. The dorsal flap 22 is partially rotated into the exhaust gas stream while the downstream flap 50 and the ventral flap 28 have been positioned vertically. Restricted nozzle throat area for vertical thrust is shown in FIG. 7e wherein the dorsal flap 22 has been rotated so as to substantially block the flow of exhaust gases aftward of the ventral flap 28.

Figure 4:
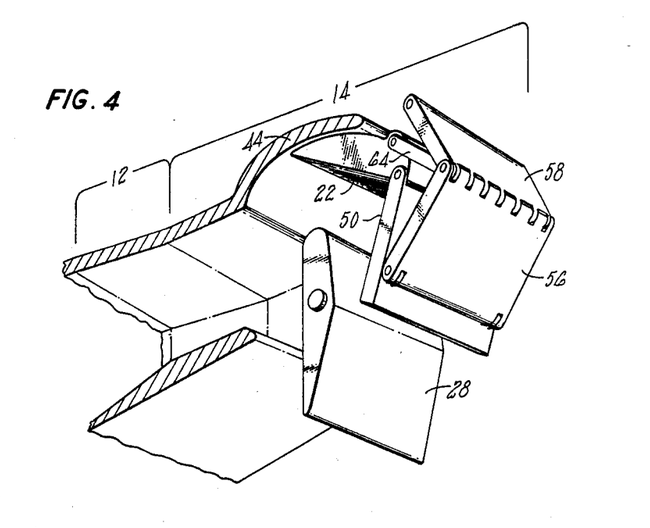
FIG. 4 shows a perspective view of the third embodiment.

By way of further explanation of the operation of the third embodiment of the nozzle according to the present invention reference will now be made to FIG. 4 which shows a partial perspective view of the components of the third embodiment nozzle in the maxmimum throat opening, fully vectored flow position shown in cross section in FIG. 7d. The ventral flap 28, the dorsal flap 22 and the downstream flap 50 are visible along with the fairing link 56, the thrust link 58, and the connecting link 64. It will be appreciated by those skilled in the art that a sliding seal, disposed between the dorsal flap 22 and the fixed dorsal wall 44 is necessary to prevent unwanted gas leakage therebetween. FIG. 4 also shows more clearly the general shape of the transition section 12 between the gas turbine engine (not shown) and the duct section 14.

Figure 6:
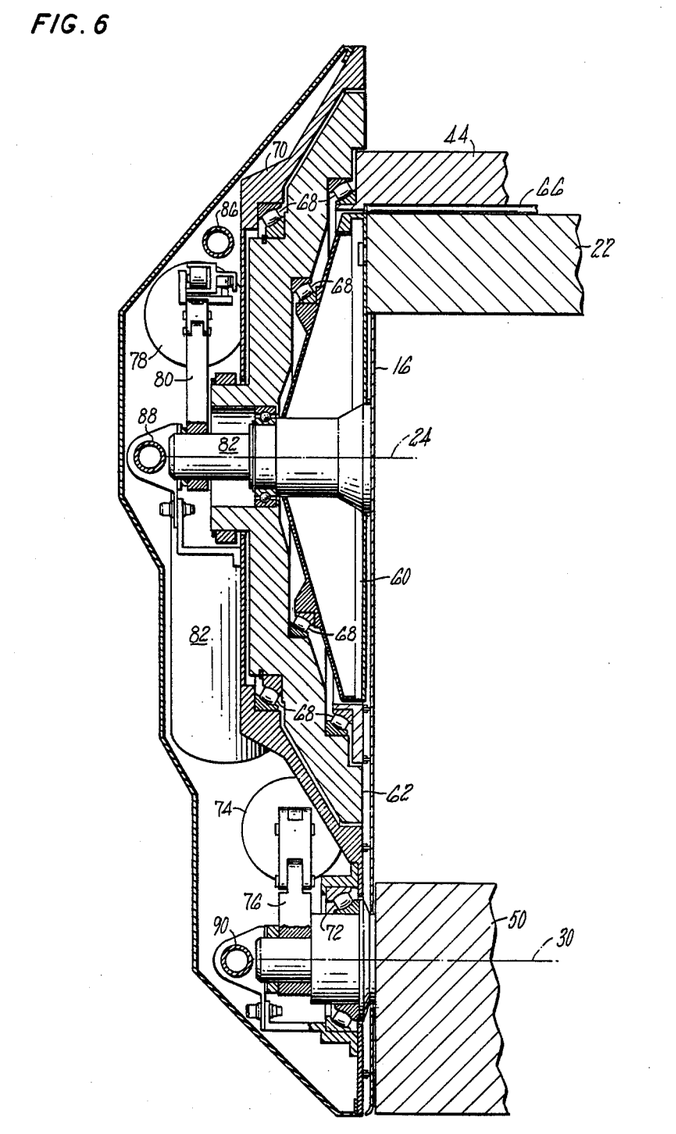
FIG. 6 shows a sectional view of the actuator of FIG. 5.

Equally as important as the aerodynamic flap surfaces for directing the exhaust gas flow are the actuators and flap supports which selectably position the individual surfaces to achieve the desired nozzle operation. FIG. 6 shows a sectional view in a plane taken through the first and second fixed axes 24, 30. The sidewall 16 is seen extending vertically between the ventral flap 50 and the fixed dorsal wall 44. The dorsal flap 22 is secured between the first pair of disks 60 which are in turn rotatable about the first fixed axis 24. A sliding seal 66 prevents undesired gas leakage between the dorsal wall 44 and the moving dorsal flap 22.

The second pair of disks 62 for selectably driving the thrust link 58 (not shown in this Figure) are disposed transversely outward of the first pair of disks 60 and also rotatable about the first fixed axis 24. A plurality of annular bearings 68 are disposed between the disks 60, 62 and a duct frame 70 for supporting the disks and hence the connected flap 22 and link 58. The ventral flap 50 is shown pivotable about the second fixed axis 30 which is itself supported by annular bearings 72 as shown.

Figure 5:
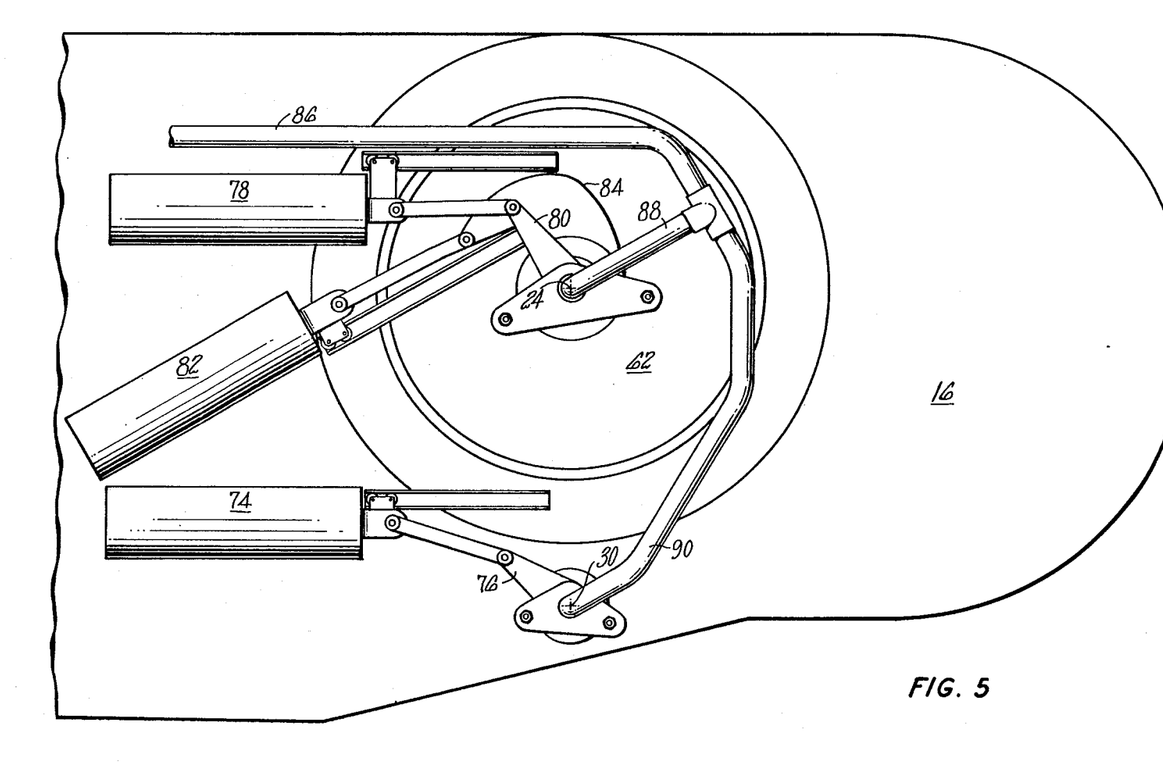
FIG. 5 shows a side view of the actuator mechanism for manipulating the third embodiment nozzle.

FIG. 5 is a side view of the actuation mechanism of the third embodiment according to the present invention showing a ventral flap actuator 74 for rotating a ventral flap bellcrank 76 about the second fixed axis 30. The first pair of disks 60 are selectably rotated by the dorsal flap actuator 78 which drives the dorsal flap bellcrank 80 and hence the first disk drive shaft 82 (shown in FIG. 6). Finally, the second disk 62 is rotated by the downstream flap actuator 82 which in turn drives the downstream flap bellcrank 84 and hence the second disk 62.

Also shown in FIG. 5 is a cooling air conduit 86 for supplying cooling air to the dorsal flap 22 and the ventral flap 50 via branch conduits 88, 90 which conduct cooling air into the flap interiors through the axial supports of the respective flaps.

In operation, the ventral, upstream, and downstream flap actuators 74, 78, 82 are driven independently in response to the aircraft nozzle control system, positioning the individual respective flaps 28, 22, 50 in accordance with the aircraft operating environment and engine/augmentor exhaust flow. A further advantage of the third embodiment nozzle according to the present invention is the location of all actuation and moving flap support bearings and other structures external to the hot exhaust gas flow, thereby improving individual component life and operation as well as both overall and individual component serviceability. Further, by combining the actuator assembly of FIG. 5 with linear actuators which preferably fail in the contracted position, the nozzle according to the present invention may be provided with a fail safe mode wherein the nozzle flaps return to the horizontal thrust position upon failure of the nozzle hydraulic system or other unforeseen problem.

It will be appreciated by those skilled in the art that numerous embodiments and arrangements of the exhaust nozzle according to the present invention may be made without departing from the spirit and scope of the embodiments disclosed hereinabove. Such embodiments and the accompanying discussion should therefore be treated only in an illustrative sense and should not be interpreted as limiting the invention thereto.

We claim:

1. An exhaust nozzle for directing a flowing stream of gas, including an exhaust duct comprising:

two opposed, spaced apart sidewalls;

an upper flap assembly disposed between the two sidewalls; and a lower flap assembly disposed between the two sidewalls, the lower flap assembly, the upper flap assembly, and the two sidewalls together defining a flow path for the gas stream, the upper flap assembly including a dorsal flap having a fore edge and an aft edge and being pivotable about a first fixed axis disposed within the gas flow path and extending between the two sidewalls, and a downstream flap, having a fore edge and an aft edge, the fore edge of the downstream flap being pivotally connected to the aft edge of the dorsal flap for cooperatively defining a movable exhaust gas directing barrier, the lower flap assembly including a ventral flap having a fore edge and an aft edge and being rotatable about a second fixed axis disposed intermediate the fore and aft edges thereof and extending between the two sidewalls;

a fixed dorsal wall, disposed between the two sidewalls and extending downstream adjacent the upper flap assembly;

means, slidably engageable between the dorsal wall and the dorsal flap, for sealing against gas leakage therebetween;

a first actuator, including a first pair of disks each disposed adjacent one of the two sidewalls, the first pair of disks cooperatively supporting the dorsal flap therebetween and being each centrally rotatable about the first fixed axis;

a linkage assembly, including a fairing link having a first end engaged with the aft end of the downstream flap, and a second end;

a connecting link, having a first end engaged with the fairing link second end, and a second end engaged with the dorsal flap; and a thrust link, having a first end connected to a second actuator and a second end engaged with either the connecting link or the fairing link for selectably positioning the downstream flap.

2. The exhaust nozzle as recited in claim 1, wherein the second actuator includes
a second pair of disks, each disposed respectively adjacent one of the first pair of disks and centrally rotatable about the first fixed axis; and
wherein the first end of the thrust link is cooperatively engaged with the second pair of disks for selectably positioning the downstream flap responsive to rotation of the second pair of disks.

3. The exhaust nozzle as recited in claim 2, further comprising:
means for selectably rotating the ventral flap about the second fixed axis for redirecting at least a portion of the flowing gas stream.

4. A nozzle, including an exhaust duct comprising:
two opposed sidewalls;
an upper flap assembly disposed between the two sidewalls;
a lower flap assembly disposed between the two sidewalls;
the upper flap assembly including a dorsal flap having a fore edge and a parallel aft edge, the dorsal flap being rotatable about a first fixed axis parallel to the fore and aft edges thereof for redirecting a flow of exhaust gas, and
a downstream flap having a fore edge and an aft edge, the downstream flap being pivotally connected at the fore edge thereof to the aft edge of the dorsal flap,
the lower flap assembly including
a ventral flap having a fore edge and an aft edge and being rotatable about a second fixed axis intermediate the fore and aft edges thereof; and
a first actuator connected to the dorsal flap for selectably positioning the dorsal flap about the first fixed axis, the first actuator having a first pair of disks each disposed adjacent one of the sidewalls and each centrally rotatable about the first fixed axis.

5. The nozzle as recited in claim 4, wherein the exhaust duct further includes
a fixed dorsal wall disposed between the two sidewalls and extending downstream adjacent the upper flap assembly,
a seal, engaged between the fixed dorsal wall and the movable dorsal flap for cooperatively defining an exhaust gas directing barrier.

6. The nozzle as recited in claim 4, further comprising:
a second actuator connected to the downstream flap for selectably pivoting the downstream flap about the aft edge of the dorsal flap, including
a linkage assembly, including
a fairing link, having a first end and a second end, pivotally connected at the first end thereof to the aft edge of the downstream flap; and
a connecting link having a first end and a second end, the connecting link first end pivotally connected to the fairing link second end and the connecting link second end pivotally connected to the dorsal flap; and
a thrust link having a first end and a second end and engaged with the connecting and fairing links for selectably pivoting the downstream flap.

7. The nozzle as recited in claim 6, wherein the second actuator further includes
a second pair of disks, each disposed respectively adjacent one of the first pair of disks and each being centrally rotatable about the first fixed axis,
wherein the thrust link first end is pivotally engaged with the linkage assembly and wherein the thrust link second end is pivotally engaged with the second pair of disks.

* * * * *